United States Patent [19]
Young

[11] 4,270,028
[45] May 26, 1981

[54] DIGITALLY ACTIVATED RINGING CIRCUIT FOR GENERATION OF AC VOLTAGES

[75] Inventor: John S. Young, Scottsdale, Ariz.

[73] Assignee: GTE Automatic Electric Laboratories Incorporated, Northlake, Ill.

[21] Appl. No.: 78,330

[22] Filed: Sep. 24, 1979

[51] Int. Cl.³ .......................................... H04M 3/02
[52] U.S. Cl. ................... 179/84 R; 179/17 E
[58] Field of Search ............. 179/84 R, 84 VF, 84 A, 179/17 E, 18 HB; 364/721; 328/14

[56] References Cited
U.S. PATENT DOCUMENTS

| | | | |
|---|---|---|---|
| 3,941,942 | 3/1976 | Nash | 179/84 VF |
| 4,045,620 | 8/1977 | Westbrook | 179/84 VF |
| 4,174,467 | 11/1979 | Ferrieu | 179/84 R |
| 4,192,007 | 3/1980 | Becker | 179/17 |

*Primary Examiner*—Gerald L. Brigance
*Attorney, Agent, or Firm*—Robert J. Black; Frank J. Bogacz

[57] ABSTRACT

A digitally activated ringing circuit for use in conjunction with a central processing unit of an electronic telephone central office is connected between the central processing unit and a telephone subscriber via the central office switching network. The ringing circuit generates an analog signal representing a particular one of a plurality of possible ringing frequencies to be applied to the subscriber line. The instantaneous values of the ringing signal are approximated by information contained within a read only memory.

10 Claims, 2 Drawing Figures

DIGITALLY ACTIVATED RINGING CIRCUIT FOR GENERATION OF AC VOLTAGES

BACKGROUND OF THE INVENTION (1) Field of the Invention

Generally, this invention pertains to a circuit for the generation of AC ringing voltages for use in conjunction with a central processing unit of a telephone central office and more particularly pertains to a digitally activated ring generation circuit for approximating the sinusoidal ringing voltage by incremental steps and applying the voltage thereby generated to the subscriber line.

(2) Description of the Prior Art

Typically, ringing generators are implemented via a collection of analog circuit equipment. With the advent of computer controlled electronic switching systems, a need arose for simple interfacing between the computer control and the ringing generator circuit. Usually elaborate interface connections had to be designed for interfacing the computer controlled logic with the logic of the ringing circuit. The logic of computers is digital in nature and of relatively low power, whereas the logic of ringing circuits is analog in nature and the ringing voltages themselves are of a relatively high level.

Such analog interface circuits as those mentioned above are costly, complex in design and require that high voltages be distributed throughout the ringing circuitry of a telephone central office.

Typically, the hazardous high voltages were developed at one particular point and bused out to the various circuits requiring this voltage. Consequently, protection was required for the AC converters. Due to the busing arrangement and the number of terminals required to connect these high voltages, a considerable amount of space was consumed by the resultant designs.

Typical analog ringing generator circuits are shown by U.S. Pat. Nos. 4,015,091, issued on Mar. 29, 1977, to T. N. Rao, et al and 4,025,729, issued on May 24, 1977 to D. E. Stone. Such circuits disclose ringing signal generators comprising direct current level converters having the ringing voltage level thereby generated interrupted at a particular rate.

U.S. Pat. No. 4,001,516, issued on Jan. 4, 1977 to G. Weisigk, et al teaches an apparatus for feeding ringing currents from a ringing current supply to particular line circuits. Such an elaborate design as taught by Weisigk et al is not required in the present invention due to the fact that each frequency is derived upon a single circuit card.

Lastly, U.S. Pat. No. 4,042,786, issued on Aug. 16, 1977, to L. Freimanis teaches a telephone ringer circuit. A high capacitance element is charged by DC voltage present on the telephone line and discharged across an electric mechanical ringer when a tone detector receives a tone alerting signal.

Therefore, it is the object of the present invention to provide a ringing circuit for use in conjunction with a central processing unit of a telephone central office which digitally interfaces with the central processing unit and manipulates the high voltages associated with ringing circuit in a safer, more efficient and less costly manner.

It is a feature of the present invention to provide for the generation of a plurality of distinct ringing frequencies and to provide as an option selection of a particular set of ringing frequencies for each of such ringing circuits that are provided. Flexibility is provided by information representing an approximation to each of the particular frequencies stored in a read only memory.

Further, it is a feature of the present invention to provide a quick response in order to remove the ring once the particular subscriber has answered the phone but not to respond so quickly that transient errors are handled as true ring trip.

In addition, it is the feature of the present invention to provide a ring generating circuit for use in conjunction with a coin collection/refund circuit, so that the two circuits are compatible and utilize common circuitry. Thereby, both the functions of ringing and coin collect can be provided on one circuit, thereby necessitating no further network connections for ringing and coin control operations. A circuit comprising both operations may be connected by the telephone switching center in one operation.

Also, it is the feature of the present invention to provide for the elimination of protectors for the high voltages which must be bused throughout the network in conventional ringing schemes.

SUMMARY OF THE INVENTION

The present invention comprises a ring generation circuit for use in a telephone switching center in conjunction with a central processing unit (CPU) for connection between said central processing unit and a telephone office switching network. The ringing circuit includes a one of eight decoder connected to the CPU of the telephone switching center. A read only memory (ROM) is connected to the decode circuit and the read only memory is in turn connected to a divide by N circuit. Miscellaneous control logic is connected to the read only memory. A clock circuit, nominally of one MHz, is connected to both the divide by N circuit and the miscellaneous control logic. The divide by N circuit is connected to an up/down counter which in turn has a plurality of outputs each connected to an input of a conventional R/2R resistor ladder network. The miscellaneous control logic is connected to the resistor ladder network. The resistor ladder network is connected to two voltage comparators, each voltage comparator is in turn connected to a pulser network. The pulser networks are connected in common to a capacitor and to the telephone office switching network through a coupling inductor.

The CPU of the telephone switching office selects the ringing generation mode of operation for the circuit and the particular frequency of a defined plurality to be applied to a subscriber's telephone. The differentiation of the particular frequency to be employed is accomplished by a decoding one of eight circuit connected to the CPU via a three bit bus. This three bit bus is also connected to the read only memory for selecting the particular one of five frequencies to be applied to the subscriber's line. The read only memory provides a strapping option so that up to four sets of five frequencies per set may be selected upon a per circuit basis. That is, each ringing circuit within the telephone central office may be manually wired to provide one of four different sets of frequencies. A one MHz clock controls miscellaneous logic which subsequently operates the read only memory to retrieve information relative to each particular frequency.

The information, a number, retrieved from the read only memory is applied to a divide by N circuit. This number is divided into the basic clock frequency of one MHz; and, the resultant series of periodic pulses is applied to an up/down counter and controls the rate at which this counter is incremented or decremented. The up/down counter provides binary outputs which are inputs to a conventional R/2R resistor ladder network. The output of the resistor ladder network is an analog representation of the output voltage at a particular instant of time. The output of the resistor ladder network appears at the input of two voltage comparators. Each voltage comparator has another input of the actual value of the ringing voltage output. These comparators operate to control pulser networks to increment or decrement the output current as required to form a sine wave. Each operation of the pulser network delivers a small incremental or decremental quantity of energy so that a count of the number of pulser operations over a particular period of time is an effective measure of the current delivered to the particular load in the telephone office switching network.

As the particular frequency to be transmitted is decoded, a resistor of a distinct value is switched into the circuit before the signal is connected to the subscriber line, since higher frequencies require higher voltages. Each of the five frequencies generated by this circuit is associated with a different resistance value.

A relay is included in this circuit which reverses the particular side of the line to which the ringing signal is applied. That is, the signal generated by this circuit may be coupled to either the tip or ring side of a subscriber's telephone line and thereby activate ringers connected to the corresponding side of the line.

The up/down counter and resistive ladder network are each 8 bits wide, thereby providing for up to 256 discrete steps of voltage with respect to a reference point of $-50$ volts. For example, if a frequency of $33\frac{1}{3}$ Hz is to be generated by the circuit, the segment of the sine curve from 0 to 30 degrees closely approximated by a straight line since the sine of 30° is one-half of the peak value. Therefore, 128 (256÷2) voltage steps may represent this frequency. Each of the 128 voltage steps is of 20 microseconds duration and the number 20 is contained in the read only memory to represent this approximation to the sine curve. The number 20 is input to the divide by N counter and the clock rate of 1 MHz divided by 20. The output of the divide by N circuit is connected to drive the up/down counter and resistive ladder network to produce the above mentioned signal.

The first 90° segment of the sine curve is broken down into eight such portions as that described above. Therefore, eight words of the read only memory are required to represent the first one quarter (0 to 90 degrees) of the frequency cycle. To form the sine curve from 90° to 180° the up/down counter has its sign complemented and the read only memory words are accessed in reverse order. Each of the five frequencies selectable by the central processing unit is represented by a block of eight words containing the appropriate divide by numbers to represent the specific frequency.

DESCRIPTION OF THE PREFERRED EMBODIMENT

Figure 1:
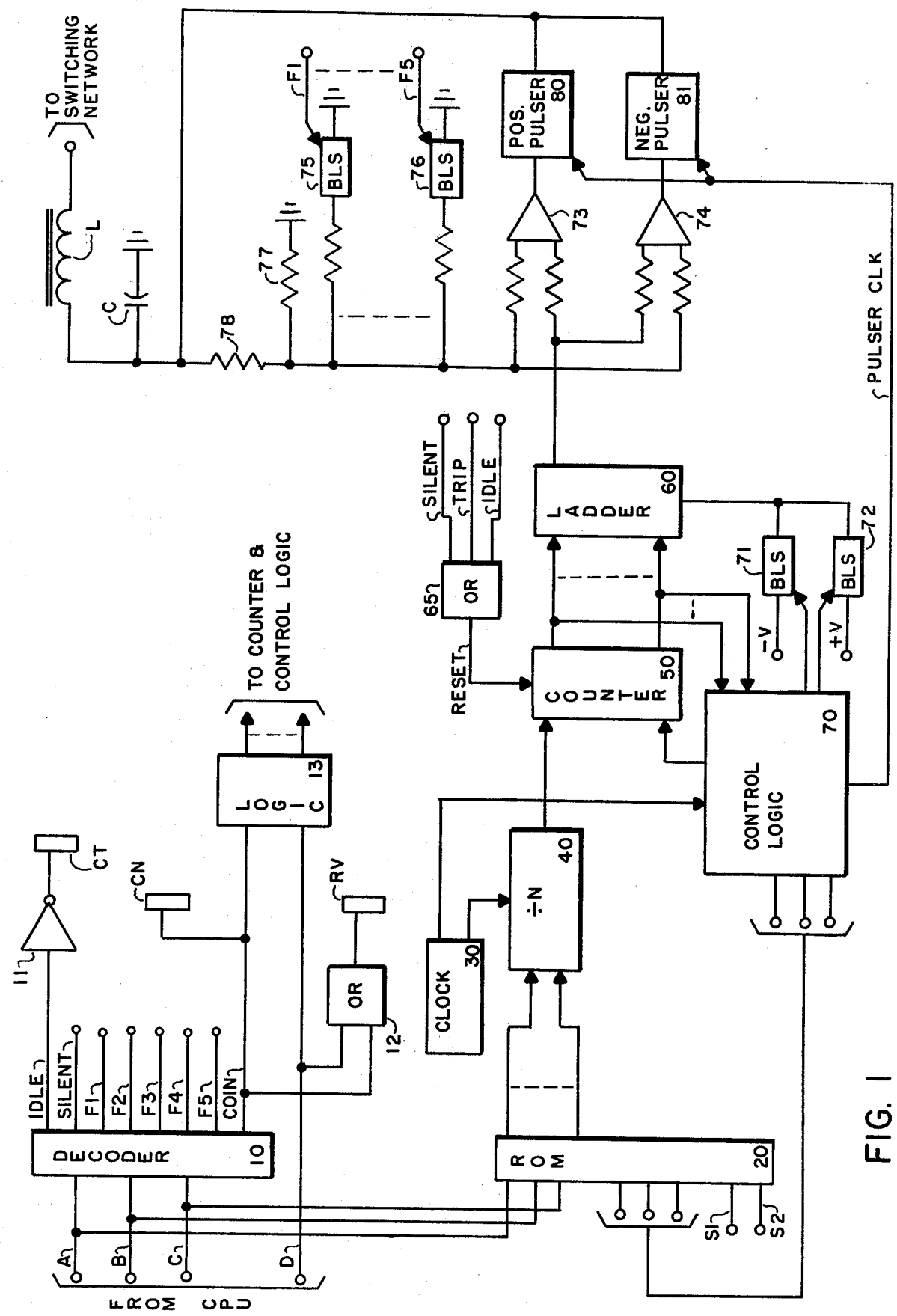
FIG. 1 is a schematic drawing representing a digitally activated ring generating circuit comprising the present invention.

The present invention is a ring generation circuit for use in a telephone switching center connected between a central processing unit (CPU) of the telephone switching center and the switching network of the switching center. The ringing circuit includes a decoder 10 connected to the CPU of the telephone switching center. A read only memory (ROM) 20 is connected to decoder 10 a divide by N circuit 40 is connected between ROM 20 and a clock 30. Clock 30 is also connected to control logic 70 which in turn is connected to ROM 20. Divide by N circuit 40 is connected to counter 50 which in turn is connected to resistive ladder network 60. Resistive ladder network 60 is connected to voltage comparators 73 and 74 which in turn are connected to pulser circuits 80 and 81 respectively. The outputs of pulsers 80 and 81 are connected to the switching network via inductor L and capacitor C. These output signals are scaled by switching a resistor of proper value into the circuit.

An 8 bit wide output channel connects counter 50 with ladder network 60. The output of resistor ladder network 60 is connected to voltage comparators 73 and 74. Clock pulses from clock circuit 30 are transmitted through control logic 70 via connection to pulsers 80 and 81. The output of pulsers 80 and 81 is connected to the common connection of resistor 78 and inductor L and capacitor C. The output of inductor L is connected to the switching network.

Decoder circuit 10 may be implemented via an LSI circuit part number SN54S138 or SN74S138. Read only memory 20 may comprise a 256 by 8 bit memory of part number SN54S371 or SN74S371. Clock 30 may comprise integrated circuit part number SN54265 or SN74265. Divide by N circuit 40 may be implemented via an LSI circuit of part number SN 54177 or SN74177.

Counter 50 may be implemented via 2 LSI circuits with part number SN54192 or SN74192. Two circuits are connected in cascade fashion so that an 8 bit wide output channel is produced. This is done since each circuit is capable of handling a 4 bit wide output.

Figure 2:
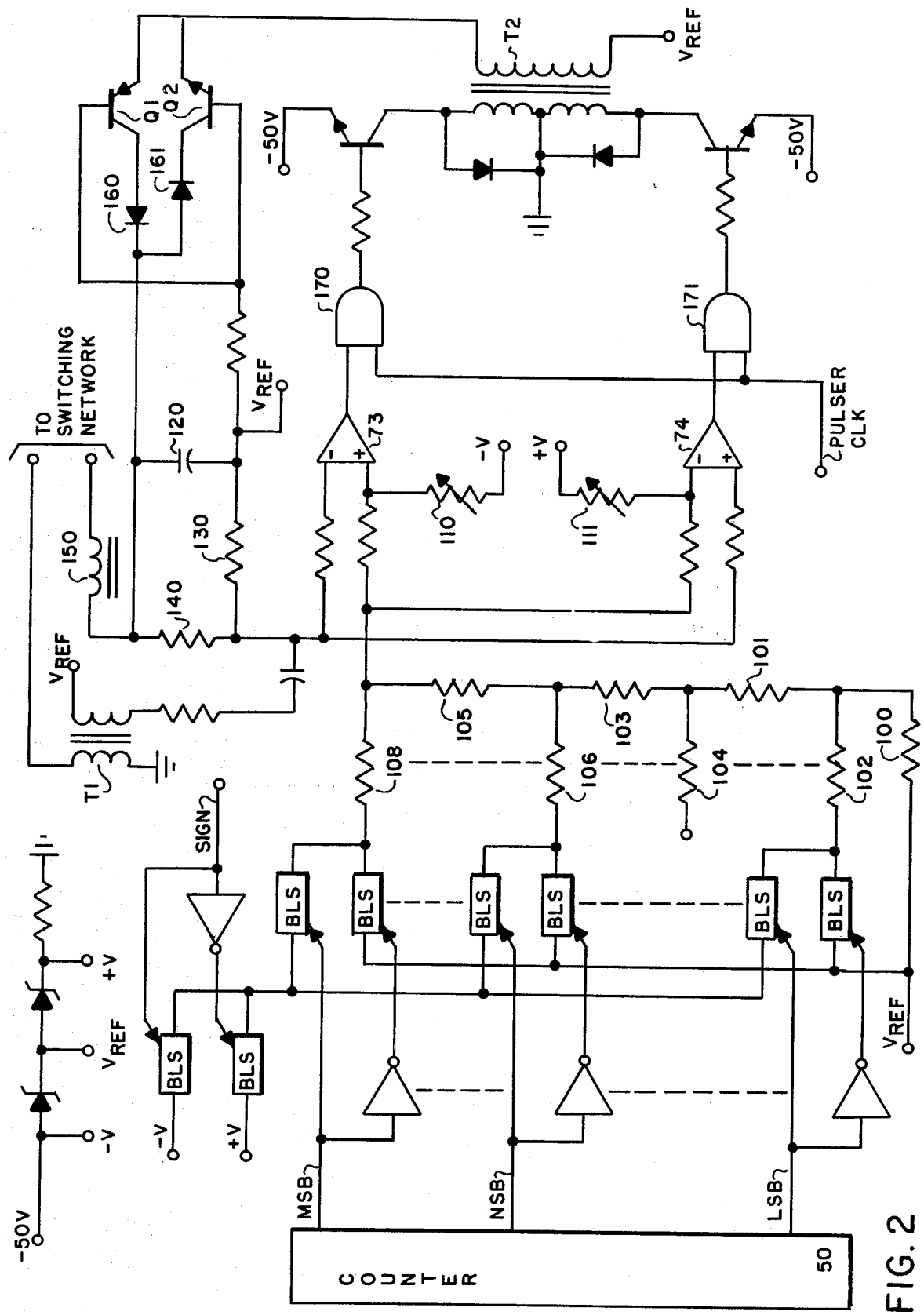
FIG. 2 is a detailed schematic drawing depicting the details of the counter, ladder and pulser circuits of FIG. 1.

Bilateral switches 71, 72, 75 and 76 of FIG. 1 and those also shown in FIG. 2 may be implemented with bilateral switches of part number 4016B, CMOS devices manufactured by Fairchild Semiconductors, Inc.

Voltage comparators 73 and 74 may be implemented with LSI circuits of part number SN5485 or SN7485. OR gates such as 12 and 65 of FIG. 1 and AND gates 170 and 171 of FIG. 2 may be implemented via SSI circuits SN7450 and SN7408 respectively. All components unless otherwise specifically stated are commercially available units manufactured by the Texas Instruments Corporation and others. The CPU and switching network may be implemented via a No. 2 EAX manufactured by GTE Automatic Electric Co. or other suitable switching system.

The CPU of the telephone switching center selects via leads A, B and C the mode of operation of the circuit (idle, silent, ringing or coin control) and the particular frequency to be employed for ringing operations. Decoder 10 determines the appropriate 1 of 5 frequencies to be output by the ringing circuit. By means of another lead D the particular side of the line (tip or ring) to which the ringing signal is to be applied is selected. Leads A, B and C also served to operate the read only memory 20 to retrieve a particular sequence of numbers, one at a time under the clock control of control logic 70. As these numbers are retrieved from memory 20, they are transmitted to divide by N circuit 40. The number transmitted counts down the one megahertz frequency supplied by clock 30. The resultant frequency is transmitted to counter 50, where counter 50 provides an 8 bit wide binary output representing the counted down frequency. The binary signals representing the counted down frequency are applied to the resistive ladder network 60. The ladder network 60 is a conventional R/2R resistive ladder network whose output is an analog representation of the binary count provided by counter 50. This analog output is representative of the ringing voltage at a particular instant of time. The output of the ladder 60 is applied to each of 2 voltage comparators 73 and 74. The comparators 73 and 74 operate to control their respective pulser networks 80 and 81 to increment or decrement the output current to form a sine wave. Each operation of pulser network 80 and 81 delivers a small incremental or decremental quantity of energy to the switching network so that, a count of the number of pulser operations over a particular time period is a measure of the current delivered to the load.

Signals F1-F5 which are decoded by decoder 10 and enable one of the bilateral switches 75-76 to be switched on (bilateral switches for frequencies F2-F4 are not shown). This switching on of one the bilateral switches serves to complete a circuit between the output of the pulser units 80 and 81 and ground whereby a particular resistance value is switched into the circuit to attenuate the signal. This is done because higher frequencies require higher voltages.

The operation of relay RV serves to select the particular side of the line (tip or ring) to which the ringing signal is applied. The contacts for relay RV are in the switching network and are not shown. The operation of relay CN controls the coin operation of the circuit (not herein discussed) and its respective contacts are also located in the switching network. Relay CT controls the cut-through operation of contacts located within the switching network.

In order to clarify the operation of the circuit, an example will be selected. If the particular frequency to be generated by the circuit is of 33⅓ Hz, the CPU of the switching center will select the appropriate one of the five frequencies. The objective of the circuit is to generate a sine wave of the appropriate frequency. To accomplish this the sine wave is approximated and since the sine of 30° is one-half of its peak value a straight line is a proper approximation for the portion the sine curve from 0 to 30 degrees therefore, since there are 256 discrete voltage steps which are able to be produced by the circuit, 128 of these voltage steps are selected to represent this frequency. Each of 128 voltage steps is of 20 microseconds in duration and therefore the number 20 is contained in the read only memory 20 to represent this first approximation to the sine curve. The number 20 is then input to the divide by N counter 40 and the 1 MHz frequency output by clock 30 is counted down by 20 to a clock rate of 20 microseconds. The output of the divide by N circuit drives the counter 50 and subsequently resistive ladder network 60 to produce an analog version of the number of pulses produced by the divide by N circuit 40. As bilateral switch 72 is enabled and as the voltage generated by ladder network 60 increases, the voltage comparator 73 puts out a logic "1" signal to operate pulser 80 to provide a number of pulses based upon the pulser clock signal, so that the summing of these pulses over a period of time is a measure of the total amount of energy supplied to the network as ringing current. Thus, the sine wave from 0 to 30 degrees is produced and similarly the portions of the sine wave from 30° to 90° are produced. The number of microseconds per period is contained in the read only memory 20 to represent each of the 8 portions of the sine curve from 0 to 90 degrees. See the table included.

| DEGREES | No. STEPS | usec/PERIOD | TIME THIS SEGMENT |
| --- | --- | --- | --- |
| 0-30 | 128 | 20 | 2560 us |
| 30-48.5 | 64 | 24 | 1536 |
| 48.5-61 | 32 | 32 | 1024 |
| 61-69.5 | 16 | 44 | 704 |
| 69.5-75.5 | 8 | 63 | 504 |
| 75.5-80 | 4 | 94 | 376 |
| 80-85 | 3 | 125 | 375 |
| 85-90 | 1 | 421 | 421 |
| | | TOTAL | 7500 us |

In order to form the sine curve from 90 to 180 degrees the counter 50 is complemented by control logic 70 and each of the 8 memory words discussed above is accessed in reverse order. In order to form the sine curve from 180° to 360° bilateral switch 71 is enabled and the process reversed. Each of the 5 frequencies is selectable by the CPU and is represented by a block of 8 words containing the appropriate microseconds per period. Leads S1 and S2 of read only memory 20 allow up to 4 different combinations of frequencies for each particular ringing circuit card. That is, leads S1 and S2 may be grounded and left open in 4 combinations to perform this selection.

Logic 13 and control logic 70 are considered to be well known in the art and control logic 70 need only provide the necessary timing function for memory fetches from ROM 20 and a pulser clock signal for positive and negative pulsers 80 and 81. Further, control logic 70 provides for a positive or negative voltage to be applied to ladder circuit 60.

Shown in FIG. 2 are the details of the resistive ladder network 60 voltage comparator 73 and 74 and pulsers 80 and 81. The bilateral switches BLS are of the same variety as those depicted in FIG. 1. The appropriate bilateral switches BLS turn on in response to the particular binary outputs of counter 50 which represent the sum of the clock pulses counted. When either of the voltage comparators 73 or 74 outputs a logic "1" signal clock pulses are gated into the associated half of the primary of transformer T2 in response, high voltage transmitters Q1 or Q2 turns on depending upon whether the emitter is driven positive or negative respectively. Thereby, the charge on capacitor 120 is incremented or decremented. The transformer T2 has a high open circuit output voltage (plus or minus 250 volts) with respect to the maximum voltage charge of capacitor 120. Capacitor 120 acts as a clamp at the particular voltage existing. When the pulse voltage decays below that level, the series transistor operated by AND gate 170 or 171 turns off to block any exchange of energy back to the transformer secondary.

Resistors 130 and 140 serve to scale the voltage input to comparators 73 and 74. In addition, the return side of the line to the switching network is transformer coupled by T1 to the comparator inputs. Inductor 150 which is in series with the output filters the high frequency components of the wave form produced. Resistors 100–108 form the resistive ladder network 60 of FIG. 1. Resistors 101, 103 and 105 etc. have a specific value of R and resistors 102, 104, 106 and 108 etc. have a value of two times R. Gates 170 and 171 along with the balanced network of transformer T2 provides a quick response in order to trip the ring condition by determining the loading within a cycle.

Although a preferred embodiment of the invention has been illustrated, and that formed described in detail, it will be readily apparent to those skilled in the art that various modifications may be made therein without departing from the spirit of the invention or from the scope of the appended claims.

What is claimed is:

1. A digitally activated ringing circuit for generation of AC voltages connected between a telephone office central processor and a telephone office switching network for providing ringing service to a plurality of telephone subscribers each subscriber having a unique ringing frequency, said switching network including a plurality of relays and associated switching contacts, said ringing circuit comprising:

a clock providing periodic pulses;

decoding means connected to said telephone office central processor for determining a particular ringing frequency of said plurality to be applied to said switching network and selectively attenuating each ringing frequency;

frequency approximating means connected to said decoding means and to said clock, and operated in response to a request for one particular frequency of said plurality of unique frequencies to produce a binary number representing an approximation to an instantaneous value representing the sinusoidal ringing signal to be produced;

counting means connected to said frequency approximating means and operated in response to said periodic pulses divided by said binary number to produce a binary value representing an instantaneous approximation of the voltage of said sinusoidal ringing signal;

resistive network means connected to said counting means for converting said binary value representation to an analog representation of said binary number;

pulsing means connected between said resistive network means and said telephone office switching network and operated in response to said analog representation of said binary number to produce a series of pulses of a first characteristic and alternatively operated to produce a series of pulses of a second characteristic, each of said series of said pulses providing an incremental quantity of current according to said binary value representing said approximation of the voltage of said ringing signal, via said telephone office switching network for transmission to a particular telephone subscriber providing said subscriber with said ringing service.

2. A digitally activated ringing circuit as claimed in claim 1, wherein: said decoding means includes a one-out-of-eight decoder circuit operated in response to a binary coded signal to produce a signal representative of a particular one of said plurality of ringing frequencies.

3. A digitally activated ringing circuit as claimed in claim 1, wherein: said frequency approximating means includes a read only memory unit containing a plurality of said binary numbers, each representing a digital approximation to a ringing voltage sine curve.

4. A digitally activated ringing circuit as claimed in claim 3, wherein: said frequency approximating means further includes a divide by N circuit connected to said read only memory unit and to said clock, said divide by N circuit operated in response to said periodic pulses produced by said clock and in response to a particular one of said binary numbers contained in said read only memory unit, whereby said periodic pulses are divided by said binary number to produce a resultant signal of a particular frequency.

5. A digitally activated ringing circuit as claimed in claim 4, wherein: said frequency approximating means further includes control logic connected to said clock and to said read only memory unit and said control logic operated in response to said clock to produce proper timing sequence of information output by said read only memory unit.

6. A digitally activated ringing circuit as claimed in claim 1, wherein: said counting means includes an up-down counter circuit connected to said frequency approximating means and said counter circuit operated in response to said resultant signal of a particular frequency of said frequency approximating means to produce a binary number representing an instantaneous value of ringing current.

7. A digitally activated ringing circuit as claimed in claim 1, wherein: said resistive network means further includes switching means connected between said frequency approximating means and said resistive network means and said switching means is operated in response to said frequency approximating means to produce a signal for alternating the polarity of said resistive network means.

8. A digitally activated ringing circuit as claimed in claim 1, wherein: said pulsing means includes first and second voltage comparators, each of said comparators connected to said resistive network means and said first comparator operated to produce a series of pulses of a first characteristic and said second comparator alternatively operated to produce a series of pulses of a second characteristic.

9. A digitally activated ringing circuit as claimed in claim 8, wherein: said pulsing means further includes attenuation means connected between said first and said second voltage comparators and said telephone switching network and connected to said decoding means, and said attenuation means operated in response to said decoding means to selectively attenuate said produced series of pulses of said first and said second characteristics.

10. A digitally activated ringing circuit as claimed in claim 9, wherein: said pulsing means further includes coupling means connected between said telephone switching network and said attenuation means and operated in response to each of said series of pulses to produce a plurality of pulses for coupling to said telephone switching network; and energy storage means connected between the common connection of said coupling means, said pulsing means and said switching means and a reference potential, and operated in response to said series of pulses of said pulsing means to accumulate of alternatively dissipate an amount of stored electric charge of said pulses.

* * * * *

UNITED STATES PATENT AND TRADEMARK OFFICE
CERTIFICATE OF CORRECTION

PATENT NO. : 4,270,028
DATED : May 26, 1981
INVENTOR(S) : John S. Young

It is certified that error appears in the above-identified patent and that said Letters Patent are hereby corrected as shown below:

Column 8, line 66, change "of" (first occurrence) to --or--.

Signed and Sealed this

Sixth Day of October 1981

[SEAL]

Attest:

Attesting Officer

GERALD J. MOSSINGHOFF

Commissioner of Patents and Trademarks